Patented Apr. 4, 1950

2,503,050

UNITED STATES PATENT OFFICE 2,503,050

PROCESS FOR PRODUCING ALDEHYDES BY ISOMERIZATION OF OLEFIN ALPHA OXIDES

Edward C. Jacobs, Wyandotte, and Lester G. Lundsted, Grosse Ile, Mich., assignors to Wyandotte Chemicals Corporation, Wyandotte, Mich., a corporation of Michigan No Drawing. Application March 11, 1947, Serial No. 733,976

7 Claims. (Cl. 260—601)

The present invention relates to the isomerization of alkylene alpha oxides (1, 2 alkylene oxides), in which the principal and predominant product is the saturated aldehyde isomer of the oxide. The invention also relates to a catalyst composition particularly suited for such aldehydo-isomerization.

In the co-pending U. S. patent application Serial No. 588,710 filed April 16, 1945, by Lester G. Lundsted, Edward J. Schwoegler and Edward C. Jacobs, said Lundsted and Jacobs being co-applicants herein, it is disclosed that a chromic oxide gel catalyst (prepared as described in vol. 63, p. 1129 of the Journal of the American Chemical Society) effects the isomerization of propylene oxide to allyl alcohol, propionaldehyde being the minor and lesser-proportion product. In other words, in the aforesaid co-pending application, the employment of the chromic oxide gel catalyst alone produced an alkylene oxide isomerization in which the ratio of allyl alcohol to the propionaldehyde was on the order of 3 to 1. We have now discovered, that by the incorporation of certain specified compounds and oxides of cadmium, tungsten and iron, this relationship can be reversed; and even to the point where, in the case of propylene oxide, there is practically no allyl alcohol and the propionaldehyde constitutes over 90% of the conversion products. The isomerization process and catalyst composition of our invention also results in exceptionally high and favorable conversion percentages.

The catalyst compositions of our invention are also particularly useful and advantageous in that they possess relatively long lives of activity; and upon regeneration treatment, have the ability of resuming or recapturing an activity paramount to that of the originally prepared catalyst composition.

Briefly outlined, our invention comprises passing an alkylene alpha oxide, preferably ethylene oxide or propylene alpha oxide, in the vapor phase, and at a space velocity in the range of 90–1600 grams per hour per liter of catalyst and at a temperature of 180°–400° C., over a catalyst composition consisting of a dried or dehydrated chromic oxide gel to which there has been added two of the following compouns: cadmium chloride, cadmium oxide, tungsten oxide and iron oxide. Preferably cadmium chloride and cadmium oxide constitute one form of such multiple addition, and tungsten oxide and iron oxide constitute another form of multiple addition. The cadmium chloride addition may be present in the parent chromic oxide gel as a direct addition of water-soluble cadmium chloride. Cadmium oxide, tungsten oxide and iron oxide, just as in the case of the parent chromic oxide (called "chromium oxide" by Turkevich et al. in their aforesaid publication in the Journal of the American Chemical Society, vol. 63, p. 1129) are present as a derivative of a soluble Cr-, W-, or Fe-, salt or oxy-acid subsequently converted to the precipitated metallic oxide by treatment with ammonium hydroxide.

Preferably, the proportions of the above-named metallic compound ingredients of our gel catalyst composition, are found to fall in certain specified ranges. The determination of the proportion of these compounds is conveniently based upon a calculation of the chemically equivalent weights of the corresponding metallic compounds employed in the synthesis of the catalyst compositions, and thence reduced to simplified or empirical chemical formulas, such as $Cr_2O_3$, $CdCl_2$, $CdO$, $WO_3$ and $Fe_2O_3$; and even though the actual chemical structure of the metallic compound components of the catalyst compositions is presently unknown, escaping precise chemical analysis. Thus, the preferred range of proportions of these ingredients is as follows: $Cr_2O_3$, 40–70% by weight; $CdCl_2$, 30–45%; $CdO$, 10–30%; $WO_3$, 15–50%; and $Fe_2O_3$, 1–3%.

In carrying out the process of our invention, the catalyst need not be admixed with, supported upon, or carried by a so-called "catalyst carrier," but is placed directly in a furnace or heating chamber (preferably mounted in a vertical position) with externally applied heat, and the vaporized or gaseous alkylene oxide then passed over and through the heated catalyst.

The following examples further illustrate our invention.

Example 1

Hydrated chromic nitrate, $Cr(NO_3)_3.9H_2O$, in the amount of 450 grams and 150 grams of ammonium acetate, together with 50 grams of hydrated cadmium chloride, $CdCl_2.2\frac{1}{2}H_2O$, were dissolved in 1.5 liters of distilled water. This solution was heated to the boiling point and then allowed to cool. After cooling there was added to the solution 413 cc. of concentrated ammonium hydroxide solution (28% by weight $NH_3$ content) diluted with 1.2 liters of distilled water. This mixture was stirred for one minute whereupon a gel or gelatinous mass was formed. This gel was then baked for 48 hours at 50° C.; resulting in a partial dehydration of the gel composition. After washing the baked gel with distilled water until nitrate and ammonium ions had been removed, there was then added 100 grams of cadmium chloride dissolved in water. This resulted in a gel composition, containing chromic oxide and cadmium oxide, either as hydrated oxides of chromium and cadmium respectively, or as the hydroxides thereof (the precise chemical nature of such metallic compounds not being known and hence here referred to as chromium oxide and cadmium oxide as the most suitable method of description); and cadmium chloride. This gel composition was baked to dryness at 240° C. On the basis of the chemical ingredients originally added and calculated according to the chemical compounds here given, this gel catalyst composition contained:

$Cr_2O_3$—2.5 mols or 43.5% by weight
$CdCl_2$—2 mols or 41.9% by weight
$CdO$—1 mol or 14.6% by weight This catalyst composition in the amount of 483 grams by weight or 300 cc. by volume was then placed in a glass tubular heating furnace 600 mm. long by 25 mm. inner diameter, with glass wool packed into the top and the bottom of the glass tube space not occupied by the catalyst composition. A thermocouple was located in the glass wool section in the top of the tube, which section functioned as the preheater for the propylene oxide fed down through the top of the glass tube furnace. A second thermocouple was located within the interior of the catalyst bed.

The temperature of both the preheater section and the catalyst bed section of the glass tube furnace was maintained (by automatic control) at 300±5° C. and 300±2° C., respectively. Propylene alpha oxide, at a space velocity of 350 grams per hour per liter of catalyst was then passed through the furnace over the period of a five hour run.

The furnace products were then analyzed. The per cent conversion (i. e. ratio of amount of oxide consumed to amount of oxide fed, X100) was found to be 74.2%. The per cent yield of converted products (i. e. weight of products/weight of oxide consumed, X100) was found to be as follows:

| Products | Per Cent by Weight |
|---|---|
| Propionaldehyde (on basis of carbonylic products analysis) | 90.3 |
| Unsaturates (as allyl alcohol) | 0.58 |
| Unknown distillates | 1.58 |
| Residue and column hold-up | 4.06 |
| Handling Loss | 3.48 |
| | 100.00 |

On the basis of furnace products obtained (including unconsumed or unreacted propylene alpha oxide), the above results calculate to be 67% propionaldehyde and 0.43% unsaturate.

*Example 2*

In this example the amount of cadmium chloride in the catalyst composition was reduced. The preparation of the gel catalyst composition was analogous to that of Example 1. The resultant catalyst was so prepared as to contain the following calculated proportion of ingredients:

$Cr_2O_3$, 4.2 mols or 56.5% by weight
$CdCl_2$, 2 mols or 32.2% by weight
$CdO$, 1 mol or 11.3% by weight The above weight percentages are on the anhydrous basis, viz: just as if the entire composition consisted only of the respective chemical compounds stated. Analogous references to weight percentages of the respective catalyst composition ingredients hereinafter given shall be on a similar basis.

Propylene alpha oxide was passed over 90 cc. of this catalyst contained in the same apparatus as described in Example 1 and at a temperature of 300° C. and a space velocity of 540.5 grams per hour per liter of catalyst. Of the furnace products recovered, 80.3% was found to be propionaldehyde (based on carbonyl analysis) and 3.2% unsaturates, as allyl alcohol.

*Example 3*

In this example the cadmium chloride was omitted from the catalyst composition and tungsten oxide and cadmium oxide added. It was prepared in the following manner:—

Four hundred fifty grams of $Cr(NO_3)_3.9H_2O$, 150 grams of ammonium acetate and 100 grams of $Cd(NO_3)_2.4H_2O$, together with 25 grams of tungstic acid were added to 1.5 liters of distilled water and the solution heated to boiling with occasional stirring. Upon cooling, concentrated ammonium hydroxide solution (28% $NH_3$), in the amount of 413 cc. diluted with 1.2 liters of distilled water were added. This was stirred for 1 minute, resulting in the formation of a gel which was then baked for 48 hours at 50° C., to produce a partial dehydration. The composition was then washed with water until it displayed an absence of nitrate ions, according to the standard "brown ring" test. Thereupon the partially dehydrated and washed gel composition was baked to dryness at 240° C. Calculated on the basis of compounds employed as starting materials, the resultant catalyst composition contained $Cr_2O_3$, 5.6 mols or 56.7% by weight; $CdO$, 3.2 mols or 27.7% by weight; and $WO_3$, 1.0 mols or 15.6% by weight.

On passing propylene alpha oxide over 130 cc. or 140 grams of this catalyst composition, in the apparatus described in Example 1, at a temperature of 315° C. and at a space velocity of 314 grams per hour per liter of catalyst, the furnace products were found to contain 63% propionaldehyde and 10.7% unsaturates.

*Example 4*

In this example, the compounds added to the parent chromic oxide gel catalyst, were tungsten oxide and iron oxide. The preparation was as follows:

Nine hundred grams of $Cr(NO_3)_3.9H_2O$, 10 grams of ferric ammonium oxalate and 300 grams ammonium acetate were dissolved in 3 liters of distilled water and the mixture stirred, heated to boiling and then permitted to cool. On cooling, an ammonical solution of tungstic acid containing 70 grams of $WO_3.H_2O$, 816 cc. of concentrated ammonium hydroxide (28% $NH_3$ content) and 2.2 liters of distilled water was added, the solution being stirred for 1 minute with subsequent gelation. The resultant gel was baked for 48 hours at 50° C. and washed with distilled water to remove $NO_3$ ions. One hundred grams of tungstic acid, dissolved in concentrated ammonium hydroxide were then added to the washed gel and the resultant composition baked to dryness in an oven at 240° C.

The composition of the resultant catalyst was calculated to be:

Cr₂O₃, 51 mols or 49.6% by weight
WO₃, 33.3 mols or 49.4% by weight
Fe₂O₃, 1 mol or 1.0% by weight Propylene alpha oxide was passed over this catalyst at a temperature of 350° C. and at a space velocity of 95 grams per hour per liter of catalyst. The conversion, on the basis of the total amount of propylene alpha oxide fed through the heated catalyst chamber was 36% to propionaldehyde (based on carbonyl analysis), 6% to unsaturates, as allyl alcohol.

Example 5

In the catalyst composition employed in this example, the relative proportions of tungsten oxide and iron oxide added to the parent chromic oxide gel, were reduced. The preparation of the catalyst composition was similar to that previously described in Example 4. The resultant composition, on a calculated basis, contained:

Cr₂O₃, 51 mols or 69.7% by weight
WO₃, 13.7 mols or 28.7% by weight
Fe₂O₃, 1 mol or 1.6% by weight On passing propylene alpha oxide over the above catalyst at a temperature of 350° C. and at a space velocity of 110 grams per hour per liter of catalyst, the furnace products were found to contain 63% propionaldehyde and 17% unsaturates.

Example 6

In the catalyst composition employed in this example the same catalyst of Example 4 was used except that after baking to dryness in an oven at 240° C., the dried gel was subsequently heated to a temperature of 1000°–1200° C. Ninety cc. of the resultant heated catalyst (i. e. 51 mols Cr₂O₃, 33.3 mols WO₃ and 1 mol Fe₂O₃) were placed in the tubular furnace. Propylene alpha oxide passed over this catalyst composition at a temperature of 214°–292° C. (temperature readings taken at increments of 1 inch apart through a 6½ inch depth of catalyst bed), and at a space velocity of 708 grams per hour per liter of catalyst. After so passing the vaporized propylene alpha oxide over the heated catalyst for a period of 4 hours and 20 minutes, the following results were obtained: 66.3% conversion of propylene alpha oxide fed of which conversion products 86.8% was propionaldehyde and 7.35% was unsaturates; or on the basis of per cent of furnace products 57.5% propionaldehyde and 4.8% unsaturates.

Example 7

In the catalyst composition employed in this example, the proportions of tungsten oxide and iron oxide were increased. This catalyst was prepared as follows:

A mixture of 450 grams of Cr(NO₃)₃.9H₂O, 150 grams of ammonium acetate and 33.9 grams of Fe(NO₃)₃.9H₂O were dissolved in 1½ liters of water, heated to the boiling point and cooled; whereupon 413 cc. of concentrated ammonium hydroxide (28% NH₃ content) were added, forming a gel. The resultant gel was baked in an oven at 58° C. for 48 hours, then washed free of nitrate ions, drained and a solution of 40 grams of tungstic acid in 150 cc. concentrated ammonium hydroxide solution was stirred in. The resultant mixture was then baked at 250° C. for approximately 96 hours, producing a hard, black product, which was thereafter heated to 450° C. for 3 hours.

The resultant catalyst composition contained the following (calculated basis):

Cr₂O₃–13.2 mols or 67.8% by weight
WO₃–3.8 mols or 29.4% by weight
Fe₂O₃–1 mol or 2.8% by weight On passing propylene alpha oxide over the above described catalyst composition at a temperature of 350° C. and at a space velocity of 296 grams per hour per liter of catalyst, the furnace products contained 55.6% propionaldehyde and 8.7% unsaturates.

For the purpose of summarizing the foregoing Examples 1–7 inc. the following table is given showing the respective amounts of catalyst composition ingredients, and the per cent of the propionaldehyde (based on carbonyl analysis) and of unsaturates, as allyl alcohol, of the furnace products.

From this table, it will be seen that the propionaldehyde constitutes the major and predominant product in each case, with the unsaturates (analyzed as allyl alcohol) being a minor proportion. In the majority of cases the ratio of the propionaldehyde to unsaturates (cf. Examples 1–5 and 7), is 6 to 1 or greater. It will also be seen that the percentage proportions of catalyst constituents confirm the preferred range of proportions stated at the outset of this description.

Table

| Constituents | Example 1 | | Example 2 | | Example 3 | | Example 4 | | Example 5 | | Example 6 | | Example 7 | |
|---|---|---|---|---|---|---|---|---|---|---|---|---|---|---|
| | Mol. Ratio | Per Cent by Wt. | Mol Ratio | Per Cent by Wt. | Mol Ratio | Per Cent by Wt. | Mol Ratio | Per Cent by Wt. | Mol Ratio | Per Cent by Wt. | Mol Ratio | Per Cent by Wt. | Mol Ratio | Per Cent by Wt. |
| Cr₂O₃ | 2.5 | 43.5 | 4.2 | 56.5 | 5.6 | 56.7 | 51 | 49.6 | 51.0 | 69.7 | 51 | 49.6 | 13.2 | 67.8 |
| CdCl₂ | 2.0 | 41.9 | 2.0 | 32.2 | | | | | | | | | | |
| CdO | 1.0 | 14.6 | 1.0 | 11.3 | 3.2 | 27.7 | | | | | | | | |
| WO₃ | | | | | 1.0 | 15.6 | 33.3 | 49.4 | 13.7 | 28.7 | 33.3 | 49.4 | 3.8 | 29.4 |
| Fe₂O₃ | | | | | | | 1.0 | 1.0 | 1.0 | 1.6 | 1.0 | 1.6 | 1.0 | 2.8 |

PER CENT OF FURNACE PRODUCTS

| | | | | | | | |
|---|---|---|---|---|---|---|---|
| Propionaldehyde | 67.0 | 80.3 | 63.0 | 36.0 | 63.0 | 57.5 | 55.6 |
| Unsaturates | 0.43 | 3.2 | 10.7 | 6.0 | 17.0 | 4.8 | 8.7 |

Example 8

In the following example, ethylene oxide was employed as the olefin alpha oxide, which was passed over the chromic oxide-cadmium chloride-cadmium oxide catalyst composition of Example 1.

The ethylene oxide, after preheating to the vapor phase, was passed over the catalyst bed at a space velocity of 490 grams per hour per liter of catalyst. The temperature of the heating furnace was maintained by means of an automatic control at 250° C. During the course of the run it was observed that a maximum temperature of 282° C. was attained in the catalyst bed in a localized spot or area. Of the ethylene oxide passed over the catalyst composition, 85% was converted, and of the furnace products, 75% consisted of acetaldehyde.

Other modes of applying the principle of our invention may be employed, changes being made as regards to the details described, provided the features stated in any of the following claims or the equivalent of such be employed.

We, therefore, particularly point out and distinctly claim as our invention:

1. The process of producing aldehydes from olefin alpha oxides which comprises heating said oxides in contact with a chromic oxide gel catalyst composition which contains, in addition to the chromic oxide, a pair of compounds selected from the group of pairs consisting of cadmium oxide-tungsten oxide and tungsten oxide-iron oxide; all of said oxides being co-precipitated from a common aqueous solution.

2. The process of producing aldehydes from olefin alpha oxides which comprises heating said oxides in contact with a chromium oxide gel catalyst composition derived from an ammoniacal gel which contains, in addition to the chromic oxide, a pair of compounds selected from the group of pairs consisting of cadmium oxide-tungsten oxide and tungsten oxide-iron oxide; all of said oxides being co-precipitated from a common aqueous solution.

3. The process of producing aldehydes from olefin alpha oxides which comprises heating said oxides in contact with a catalyst composition derived from a dehydrated, ammoniacal gel mixture of chromic oxide, cadmium oxide and tungsten oxide; all of said oxides being co-precipitated from a common aqueous solution.

4. The process of producing aldehydes from olefin alpha oxides which comprises heating said oxides in contact with a catalyst composition derived from a dehydrated, ammoniacal gel mixture of chromic oxide, tungsten oxide and iron oxide; all of said oxides being co-precipitated from a common aqueous solution.

5. The process of producing aldehydes from olefin alpha oxides which comprises passing said oxides at a space velocity of 90-1600 grams per hour per liter of catalyst and at a temperature of 180°-400° C. over a catalyst composition comprising essentially chromic oxide in admixture with a pair of compounds selected from the group of pairs consisting of cadmium oxide-tungsten oxide and tungsten oxide-iron oxide; all of said oxides being co-precipitated from a common aqueous solution.

6. The process of producing the corresponding saturated aldehydes from propylene alpha oxide and ethylene oxide which comprises passing the oxide at a space velocity of 90-1600 grams per hour per liter of catalyst, at a temperature of 180°-400° C. over a catalyst composition derived from a dehydrated, ammoniacal gel mixture of of chromic oxide, cadmium oxide and tungsten oxide; all of said oxides being co-precipitated from a common aqueous solution.

7. The process of producing the corresponding saturated aldehydes from propylene alpha oxide and ethylene oxide which comprises passing the oxide at a space velocity of 90-1600 grams per hour per liter of catalyst, at a temperature of 180°-400° C. over a catalyst composition derived from a dehydrated, ammoniacal gel mixture of chromic oxide, tungsten oxide and iron oxide; all of said oxides being co-precipitated from a common aqueous solution.

EDWARD C. JACOBS.
LESTER G. LUNDSTED.

REFERENCES CITED

The following references are of record in the file of this patent:

UNITED STATES PATENTS

| Number | Name | Date |
|---|---|---|
| 1,906,833 | Baur I | May 2, 1933 |
| 2,031,200 | Baur II | Feb. 18, 1936 |
| 2,159,507 | Law et al. | May 23, 1939 |
| 2,351,094 | Blaker | June 13, 1944 |